United States Patent
Kim et al.

(10) Patent No.: US 9,547,820 B2
(45) Date of Patent: Jan. 17, 2017

(54) METHOD OF CLASSIFYING INPUT PATTERN AND PATTERN CLASSIFICATION APPARATUS

(71) Applicants: Samsung Electronics Co., Ltd., Suwon-si (KR); Industry-Academic Cooperation Foundation, Yonsei University, Seoul (KR)

(72) Inventors: Youn-ho Kim, Hwaseong-si (KR); Chang-mok Choi, Yongin-si (KR); Kun-soo Shin, Seongnam-si (KR); Myoung-ho Lee, Seoul (KR); Jin-kwon Kim, Seoul (KR)

(73) Assignees: Samsung Electronics Co., Ltd., Suwon-si (KR); INDUSTRY-ACADEMIC COOPERATION FOUNDATION, YONSEI UNIVERSITY, Seoul (KR)

( * ) Notice: Subject to any disclaimer, the term of this patent is extended or adjusted under 35 U.S.C. 154(b) by 296 days.

(21) Appl. No.: 13/626,244

(22) Filed: Sep. 25, 2012

(65) Prior Publication Data

US 2013/0117207 A1 May 9, 2013

(30) Foreign Application Priority Data

Nov. 8, 2011 (KR) .......................... 10-2011-0115919

(51) Int. Cl.
*G06N 3/08* (2006.01)

(52) U.S. Cl.
CPC ...................................... *G06N 3/08* (2013.01)

(58) Field of Classification Search
None
See application file for complete search history.

(56) References Cited

U.S. PATENT DOCUMENTS 5,579,778 A * 12/1996 Baker et al. .................. 600/504
5,622,171 A * 4/1997 Asada et al. .................. 600/408
(Continued)

FOREIGN PATENT DOCUMENTS

KR 10-2009-0049426 A 5/2009

OTHER PUBLICATIONS

Acharya, "Classi-cation of heart rate data using arti-cial neural network and fuzzy equivalence relation", Pattern Recognition 36 (2003) 61-68, vol. 36, Issue I, Jan. 2003, pp. 61-68.*
(Continued)

*Primary Examiner* — Stanley K Hill
*Assistant Examiner* — Ilya Traktovenko
(74) *Attorney, Agent, or Firm* — NSIP Law

(57) ABSTRACT

A method of classifying an input pattern and a pattern classification apparatus are provided. The method includes enabling an artificial neural network to learn based on learning input data received by an input layer of the artificial neural network, determining classification of an input pattern received by the input layer of the enabled artificial neural network according to an output value obtained from an output layer of the artificial neural network, the obtained output value being based on the input pattern, updating connection intensities of a plurality of connection lines of the enabled artificial neural network to output a result value indicating the determined classification from the output layer when the input pattern, and determining updated classification of the input pattern according to an updated output value obtained from an output layer of the updated artificial neural network, the obtained updated output value being based on the input pattern.

19 Claims, 7 Drawing Sheets

(56) References Cited

U.S. PATENT DOCUMENTS

| | | | |
|---|---|---|---|
| 5,857,178 A * | 1/1999 | Kimura et al. | 706/41 |
| 6,226,544 B1 * | 5/2001 | Yamazaki et al. | 600/408 |
| 6,240,343 B1 * | 5/2001 | Sarangapani et al. | 701/29.1 |
| 6,654,730 B1 * | 11/2003 | Kato et al. | 706/22 |
| 6,678,669 B2 | 1/2004 | Lapointe et al. | |
| 6,953,436 B2 | 10/2005 | Watrous et al. | |
| 6,953,486 B2 | 10/2005 | Pruche | |
| 7,412,282 B2 | 8/2008 | Houben | |
| 7,610,086 B1 | 10/2009 | Ke et al. | |
| 8,762,306 B2 * | 6/2014 | Cameron et al. | 706/20 |
| 2003/0018277 A1 * | 1/2003 | He | 600/544 |
| 2003/0055796 A1 * | 3/2003 | Shetty et al. | 706/15 |
| 2004/0017586 A1 * | 1/2004 | Nichogi | 358/2.1 |
| 2005/0071304 A1 * | 3/2005 | Schomburg | 706/20 |
| 2008/0103403 A1 * | 5/2008 | Cohen | 600/509 |
| 2008/0208577 A1 * | 8/2008 | Jeong et al. | 704/231 |
| 2009/0192958 A1 * | 7/2009 | Todorokihara | 706/27 |
| 2010/0030716 A1 * | 2/2010 | Calise et al. | 706/23 |
| 2010/0268353 A1 * | 10/2010 | Crisalle et al. | 700/29 |
| 2011/0225112 A1 * | 9/2011 | Cameron et al. | 706/20 |

OTHER PUBLICATIONS

Jadhav, "Artificial Neural Network Based Cardiac Arrhythmia Classification Using ECG Signal Data", 2010 International Conference on Electronics and Information Engineering (ICEIE 2010), 2010 International Conference on Electronics and Information Engineering (ICEIE), Date of Conference: Aug. 1-3, 2010.*

Jiang, "Block-Based Neural Networks for Personalized ECG Signal Classification", IEEE Transactions on Neural Networks, vol. 18, No. 6, Nov. 2007.*

Prasad, "Classification of ECG Arrhythmias using Multi-Resolution Analysis and Neural Ndtworks", Conference on Convergent Technolog ies for the Asia-Pacific Region TENCON 2003, Date of Conference: Oct. 15-17, 2003.*

Wang, "A Short-Time Multifractal Approach for Arrhythmia Detection Based on Fuzzy Neural Network", IEEE Transactions on Biomedical Engineering, vol. 48, No. 9, Sep. 2001.*

Yan, "Development of a Decision Support System for Heart Disease Diagnosis Using Multilayer Perceptron", Proceedings of the 2003 International Symposium on Circuits and Systems, 2003. ISCAS '03, Date of Conference: May 25-28, 2003.*

* cited by examiner

METHOD OF CLASSIFYING INPUT PATTERN AND PATTERN CLASSIFICATION APPARATUS

CROSS-REFERENCE TO RELATED APPLICATIONS

This application claims the benefit under 35 U.S.C. §119(a) of Korean Patent Application No. 10-2011-0115919, filed on Nov. 8, 2011, in the Korean Intellectual Property Office, the entire disclosure of which is incorporated herein by reference for all purposes.

BACKGROUND

1. Field

The following description relates to a method of classifying and an apparatus to classify an input pattern.

2. Description of Related Art

Artificial neural networks have been applied to various fields in which pattern recognition is performed, such as, for example, pattern classification, continuous mapping, nonlinear system identification, nonlinear control, robot control, and other fields known to one of ordinary skill in the art. The artificial neural network is obtained by engineering a cell structure model of the human brain where a process of efficiently recognizing a pattern is performed. An artificial neural network refers to a calculation model that is based on software or hardware designed to imitate biological calculation ability by applying many artificial neurons interconnected through connection lines.

The human brain consists of neurons that are basic units of a nerve and encrypts or decrypts information according to types of dense connections between the neurons. The artificial neutrons are obtained through the simplification of biological neuron functionality. In addition, the artificial neural network performs a cognition process or a learning process by interconnecting artificial neurons having connection intensities. The connection intensity, which is also referred to as a connection weight, is a predetermined value of the connection line.

Pattern classification methods are applied to medical devices. Electrical biological signals of patients that are received by medical devices, such as, for example, electrocardiography signals, brain waves, electromyography signals, and other signals of patients known to one of ordinary skill in the art, are measured and patterns of the measured biological signals are classified to determine diseases. Recently, research has been directed to ways by which a human method of pattern recognition may be applied to a practical computer, including an application of an artificial neural network to a practical computer that has been obtained based on an engineered model of a cell structure of the human brain that performs pattern recognition.

In order to model a human ability to recognize patterns, an artificial neural network has been designed to perform mapping between input patterns and output patterns based on an algorithm generated by the artificial neural network, thereby enabling the artificial neural network to imitate human learning ability. In addition, based on learning results, the artificial neural network has been designed to generalize by generating a relatively correct output based on an input pattern not reflecting an imitation of human learning ability.

SUMMARY

In one general aspect, there is provided a method of classifying an input pattern, the method including enabling an artificial neural network to learn based on learning input data received by an input layer of the artificial neural network, determining classification of an input pattern received by the input layer of the enabled artificial neural network according to an output value obtained from an output layer of the artificial neural network, the obtained output value being based on the input pattern, updating connection intensities of a plurality of connection lines of the enabled artificial neural network to output a result value indicating the determined classification from the output layer when the input pattern is input, and determining updated classification of the input pattern according to an updated output value obtained from an output layer of the updated artificial neural network, the obtained updated output value being based on the input pattern.

The method may further include outputting learning output data from an output layer of the enabled artificial neural network, the learning output data corresponding to the learning input data.

The method may further include that the learning output data corresponds to the obtained output value.

The method may further include that the artificial neural network includes a single hidden layer.

The method may further include the updating of the connection intensities includes updating a group of the plurality of the connection lines between a hidden layer and the output layer of the enabled artificial neural network.

The method may further include determining the plurality of the connection lines to be updated from among the connection lines of the enabled artificial neural network.

The method may further include that the determining of the plurality of the connection lines includes determining a group of the plurality of the connection lines between a hidden layer and the output layer.

The method may further include that the determining of the plurality of the connection lines includes determining a set of connection intensities of the group of the plurality of the connection lines between the hidden layer and the output layer based on a principal component analysis (PCA) method.

The method may further include that the updating of the connection intensities includes fixing connection intensities of a group of the plurality of the connection lines between the input layer and a hidden layer of the enabled artificial neural network, and updating a plurality of the connection intensities of a second group of the plurality of the connection lines between the hidden layer and the output layer.

In another general aspect, there is provided a computer readable recording medium having recorded thereon a program for executing the method of classifying an input pattern.

In yet another general aspect, a pattern classification apparatus includes a learning unit configured to enable an artificial neural network to learn based on learning input data inputted to an input layer of the artificial neural network, a pattern classification unit configured to determine classification of an input pattern received by the input layer of the enabled artificial neural network according to an output value obtained from an output layer of the artificial neural network, the obtained output value being based on the input pattern, and a connection intensity updating unit configured to update connection intensities of a plurality of connection lines of the enabled artificial neural network to output a result value indicating the determined classification from the output layer when the input pattern in input, where the pattern classification unit is further configured to determine an updated classification of the input pattern according to an updated output value obtained from an output layer of the updated artificial neural network, the obtained updated output value being based on the input pattern.

The pattern classification apparatus may further include that the learning unit is further configured to output learning output data from an output layer of the enabled artificial neural network, the learning output data corresponding to the learning input data.

The pattern classification apparatus may further include that the learning output data corresponds to the obtained output value.

The pattern classification apparatus may further include that the artificial neural network includes a single hidden layer.

The pattern classification apparatus may further include that the connection intensity updating unit is further configured to update a group of the plurality of the connection lines between a hidden layer and the output layer of the enabled artificial neural network.

The pattern classification apparatus may further include that the connection intensity updating unit is further configured to determine the plurality of the connection lines to be updated from among the connection lines of the enabled artificial neural network.

The pattern classification apparatus may further include that the connection intensity updating unit is further configured to determine a group of the plurality of the connection lines between a hidden layer and the output layer.

The pattern classification apparatus may further include that the connection intensity updating unit is further configured to determine a set of connection intensities of the group of the plurality of the connection lines between the hidden layer and the output layer based on a principal component analysis (PCA) method.

The pattern classification apparatus may further include that the connection intensity updating unit is further configured to fix connection intensities of a group of the plurality of the connection lines between the input layer and the hidden layer of the enabled artificial neural network, and update a plurality of the connection intensities of a second group of the plurality of the connection lines between the hidden layer and the output layer.

According to another aspect of the present invention, a computer readable recording medium having recorded thereon a program for executing the method.

Other features and aspects may be apparent from the following detailed description, the drawings, and the claims.

Figure 1:
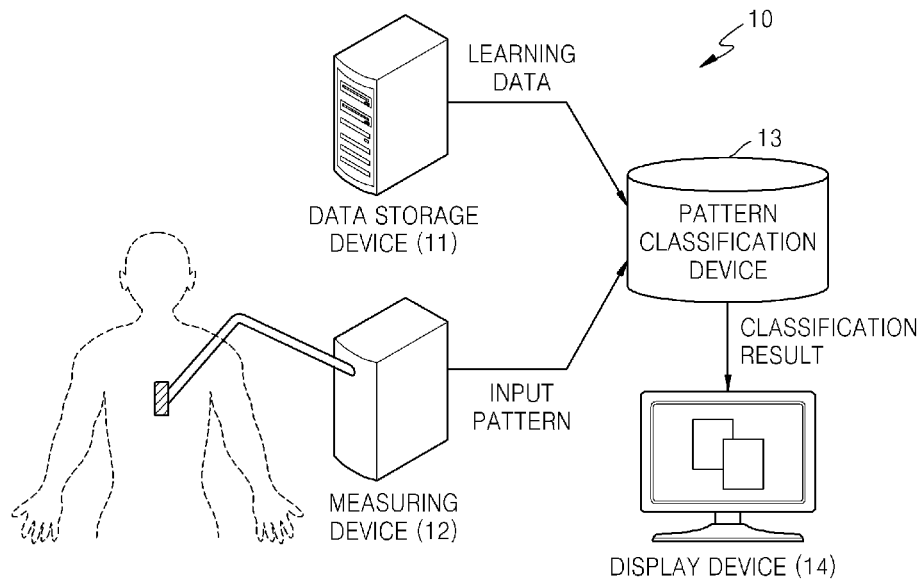
FIG. 1 is a structural diagram illustrating an example of a pattern classification system.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. In addition, descriptions of well-known functions and constructions may be omitted for increased clarity and conciseness.

FIG. 1 is a structural diagram illustrating an example of a pattern classification system 10. Referring to the example illustrated in FIG. 1, the pattern classification system 10 includes a data storage device 11, a measuring device 12, a pattern classification device 13, and a display device 14. In FIG. 1, the data storage device 11, the measuring device 12, the pattern classification device 13, and the display device 14 are shown as separate devices, but are not limited thereto. In an alternative example, the data storage device 11, the measuring device 12, the pattern classification device 13, and the display device 14 is a single integrated device having all functions of the separate devices. In addition, the components included in the example illustrated in FIG. 1 are not limited thereto and may include other general-purpose components.

When learning input data is received by an input layer of an artificial neural network, the pattern classification system 10 enables the artificial neural network to learn. In an example, because of the enabling of the artificial neural network, learning output data corresponding to the learning input data is output from an output layer of the artificial neural network. In an example, learning data includes learning input data and learning output data and is stored in the data storage device 11.

The pattern classification system 10 further receives a predetermined input pattern from the measuring device 12, classifies the input pattern as any one group from among various groups by using the artificial neural network, and outputs the classification result. That is, the pattern classification system 10 determines a corresponding group to which a value that is output when the input pattern is input to the input layer of the artificial neural network belongs and classifies the input pattern as the corresponding group. The pattern classification system 10 may be a face recognition system a face to identify a person, a diagnosis system a biological signal to diagnose a disease, or any other system known to one of ordinary skill in the art to utilize classification of patterns.

The data storage device 11 stores the learning data that is used to enable the artificial neural network of the pattern classification device 13 to learn and outputs the learning data to the pattern classification device 13 upon request of the pattern classification device 13. The learning data includes learning input data and learning output data corresponding to the learning input data. The learning input data is of the same type as the input pattern output from the measuring device 12. In an example, in order to diagnose arrhythmia from an electrocardiography signal of a patient, values extracted from electrocardiography signals measured from other human bodies correspond to the learning input data. In this case, the learning output data corresponds to an output value output from the output layer of the artificial neural network. Based on the learning output data, the corresponding electrocardiography signal is classified as a normal case or arrhythmia.

The measuring device 12 measures a signal, generates an input pattern from the measured signal, and outputs the input pattern to the pattern classification device 13. In an example, the input pattern output from the measuring device 12 corresponds to data extracted from the measured signal. In this case, when an electrocardiography signal of a patient is measured, the input pattern corresponds to a heart rate, a QRS duration, a PR interval, a QT interval, or data known to one of ordinary skill in the art that is extracted from the measured electrocardiography signal.

The pattern classification device 13 outputs the classification result with respect to the input pattern by using the artificial neural network. The pattern classification device 13 receives the learning data from the data storage device 11. When the learning input data is input to the artificial neural network, the pattern classification device 13 enables the artificial neural network to learn so that the learning output data corresponding to the learning input data may be output, and allows the artificial neural network to generate mapping. When the input pattern is input from the measuring device 12 to the artificial neural network generating the mapping, the artificial neural network outputs an output value corresponding to the input pattern, based on a result of the mapping. The pattern classification device 13 outputs a classification result according to the output value.

An example where arrhythmia is determined from an electrocardiography signal will be described. The pattern classification device 13 enables the artificial neural network including a single hidden layer to learn based on the learning data received from the data storage device 11 and identifies a principal component from among connection lines between the hidden layer and the output layer of the artificial neural network based on a principal component analysis (PCA) method. Based on the predetermined input pattern received from the measuring device 12, the pattern classification device 13 updates a connection intensity of the identified principal component based on an extreme learning machine (ELM) method. The pattern classification device 13 inputs the input pattern to the input layer of the updated artificial neural network, classifies the input pattern according to a value output from the output layer of the updated artificial neural network, and outputs a result of the classification to the display device 14. The pattern classification device 13 updates only the identified principal component from among connection lines between the hidden layer and the output layer of the artificial neural network including a single hidden layer by using the ELM method, based on the initially input pattern.

The pattern classification device 13 enables the artificial neural network including a single hidden layer to learn, determines connection intensities of connection lines by using an ELM method based on an input pattern that is initially received from the measuring device 12 to have connection intensities suitable for the input pattern, and classifies the input pattern through the artificial neural network that completely learns based on the input pattern. That is, the pattern classification device 13 determines the connection intensity of the artificial neural network through learning.

The pattern classification device 13 enables the artificial neural network to learn, based on the learning data received from the data storage device 11, which means that the pattern classification device 13 determines the connection intensity. The pattern classification device 13 identifies a principal component from among connection lines between the hidden layer and the output layer of the artificial neural network based on a PCA method. The principle component refers to connection lines having a greatest effect on a value corresponding to the output data from among connection lines, when input data is input to the input layer of the artificial neural network and output data is output from the output layer of the artificial neural network. The PCA method is a method of obtaining a principal component based on a basis function of the artificial neural network.

After the principal component is identified, when the input pattern is input to the input layer of the enabled artificial neural network from the measuring device 12, the pattern classification device 13 outputs the classification result with respect to the input pattern based on the learning result of the enabled artificial neural network. In this case, since the input pattern of the artificial neural network is not data used for the artificial neural network to learn, the pattern classification device 13 updates connection intensities of a group of the connection lines between the hidden layer and the output layer from among connection lines of the enabled artificial neural network to update the artificial neural network to have a connection intensity suitable for the input pattern. In this case, the group of the connection lines is selected from the connection lines between the hidden layer and the output layer based on a PCA method. In this case, connection intensities of a group of the connection lines between the input layer and the hidden layer are fixed as a value that is previously learned by the enabled artificial neural network. The pattern classification device 13 outputs the classification result with respect to the input pattern, based on the updated connection intensity of the enabled artificial neural network. In an example, since the pattern classification device 13 enables the artificial neural network to learn a connection intensity of a principal component between the hidden layer and the output layer by using an ELM method, based on an input pattern that is input for an initial period of time, the pattern classification device 13 may classify the input pattern by using the enabled artificial neural network based on the input pattern.

In order to explain an operation of the pattern classification device 13, an example of a medical system configured to diagnose arrhythmia based on measuring a rate and regularity of heartbeats by electrocardiography will be described. In an example, the data storage device 11 obtains and stores a plurality of pieces of electrocardiography data from an ECG-MIT-BIT DB. The ECG-MIT-BIT DB is a database of electrocardiography data used to diagnose arrhythmia. That is, the ECG-MIT-BIT DB indicates the database of electrocardiography signals obtained from the human body having particular arrhythmia and stores correspondence between electrocardiography signals and types of arrhythmia.

The pattern classification device 13 receives the ECG-MIT-BIT DB from the data storage device 11 and enables the artificial neural network to learn. In the ECG-MIT-BIT DB, output data corresponding to input data is already determined. Thus, in an example, when input data is input to the input layer of the enabled artificial neural network through the ECG-MIT-BIT DB, connection intensities of connection lines of the enabled artificial neural network are determined to output the output data corresponding to the input data. After the connection lines of the enabled artificial neural network are determined, the pattern classification device 13 identifies, as a principal component, connection lines from among connection lines between the hidden layer and the output layer based on a PCA method. The principle component refers to connection lines having a greatest effect on output data from among connection lines between the hidden layer and the output layer, when input data is input.

The input layer of the enabled artificial neural network receives electrocardiography data from the measuring device 12. When the electrocardiography data is input, the enabled artificial neural network updates connection intensities of the principal component from among connection lines between the hidden layer and the output layer of the enabled artificial neural network, based on the initially input pattern. When the enabled artificial neural network is updated to have a connection intensity suitable to classify the input pattern, the updated artificial neural network outputs the classification result with respect to the electrocardiography data, based on the updated connection intensity. The classification result with respect to the electrocardiography data, which is output from the updated artificial neural network, is a result about correspondence between electrocardiography data and atrial fibrillation, atrial flutter, atrial tachycardia, and other types of arrhythmia known to one of ordinary skill in the art.

Thus far, the case of electrocardiography has been described, but input patterns are not limited thereto. Indeed, in examples, various input patterns other than electrocardiography are used.

Figure 2:
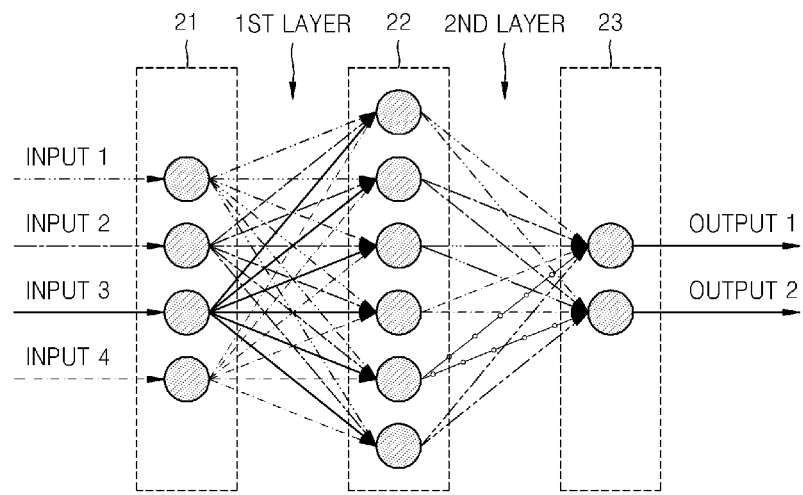
FIG. 2 is a diagram illustrating an example of an artificial neural network of the pattern classification system of FIG. 1.

FIG. 2 is a diagram illustrating an example of an artificial neural network of the pattern classification system 10 of FIG. 1. Referring to the example illustrated in FIG. 2, the artificial neural network includes an input layer 21, a hidden layer 22, and an output layer 23. Input values input through the input layer 21 of the artificial neural network are multiplied by connection intensities of connection lines of a 1$^{st}$ layer between the input layer 21 and the hidden layer 22 and are input to the hidden layer 22. The hidden layer 22 performs a calculation on the input value and outputs the calculated value to the output layer 23. Values output from the hidden layer 22 are multiplied by connection intensities of a 2$^{nd}$ layer between the hidden layer 22 and the output layer 23 and are input to the output layer 23. The output layer 23 performs a calculation on the input value and outputs the calculated value. The input layer 21, the hidden layer 22, and the output layer 23 are each referred to as a neuron or a node.

Connection intensities of connection lines between the input layer 21 and the hidden layer 22, and connection intensities of connection lines between the hidden layer 22 and the output layer 23 are each referred to as a connection weight or a density of connection line. A connection intensity is a predetermined value of each of the connection lines. A value transmitted through a connection line is multiplied by the connection intensity of the connection line. The input layer 21 is a neuron to which an input pattern to be classified is input. The hidden layer 22 is a neuron that performs a calculation on an input value and overcomes nonlinear problems. The output layer 23 is a neuron that outputs an output value of the input pattern, based on input values. When the artificial neural network includes various hidden layers, the artificial neural network is referred to as a multilayered neural network. Like the artificial neural network of the example illustrated in FIG. 2, when the artificial neural network includes a single hidden layer 22, the artificial neural network is referred to as a single layer feedforward network (SLFN).

Figure 3:
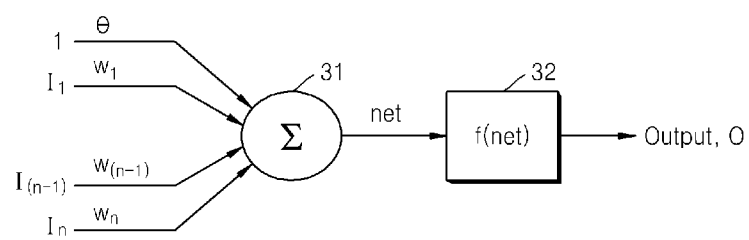
FIG. 3 is a diagram illustrating an example obtained by engineering a neuron model of an artificial neural network.

FIG. 3 is a diagram illustrating an example obtained by engineering a neuron model of an artificial neural network. Referring to the example illustrated in FIG. 3, the neuron of the artificial neural network adds input values multiplied by connection values, performs calculation on the calculated value, and outputs a result of the calculation. An adding unit 31 adds the input values and outputs a result of the adding (i.e., net). The adding unit 31 performs the calculation according to Formula 1 below, where $W_i$ denotes a connection intensity or weight connected to $i_{th}$ input of a neuron, $\theta$ denotes a threshold or bias of the neuron, and net denotes a weight sum of inputs.

$$\text{net} = \sum_{i=1}^{n} W_i I_i + \theta \qquad \text{[Formula 1]}$$

An activation function 32 receives the net from the adding unit 31 and performs a calculation. An activation function f (net) is a nonlinear function and enables the artificial neural network to generate nonlinear function mapping. In examples, an activation function is a sigmoid function, a hard limiter function, or any appropriate activation function known to one of ordinary skill in the art. If the activation function is a sigmoid function, as a value corresponding to the net is increased, a result obtained through calculation using the sigmoid function is closer to 1. When the value corresponding to the net is 0, the result is ½. As the value corresponding to the net is reduced in a negative region, the result is closer to 0. In an example with regard to an analog signal, an activation function includes a sigmoid function. The sigmoid function is expressed by Formula 2 below.

$$\text{output} = f(\text{net}) = \frac{1}{1 + e^{-net}} \qquad \text{[Formula 2]}$$

If the activation function is a hard limiter function, when the value corresponding to the net is a positive value, a result obtained through calculation using the hard limiter function is 1. When the value corresponding to the net is a negative value, the result is 0. In an example with regard to a digital signal, an activation function includes a hard limiter function. The hard limiter function is expressed by Formula 3 below.

$$f(\text{net}) \begin{cases} 1 & \text{if net} > 0 \\ 0 & \text{if net} < 0 \end{cases} \qquad \text{[Formula 3]}$$

Figure 4:
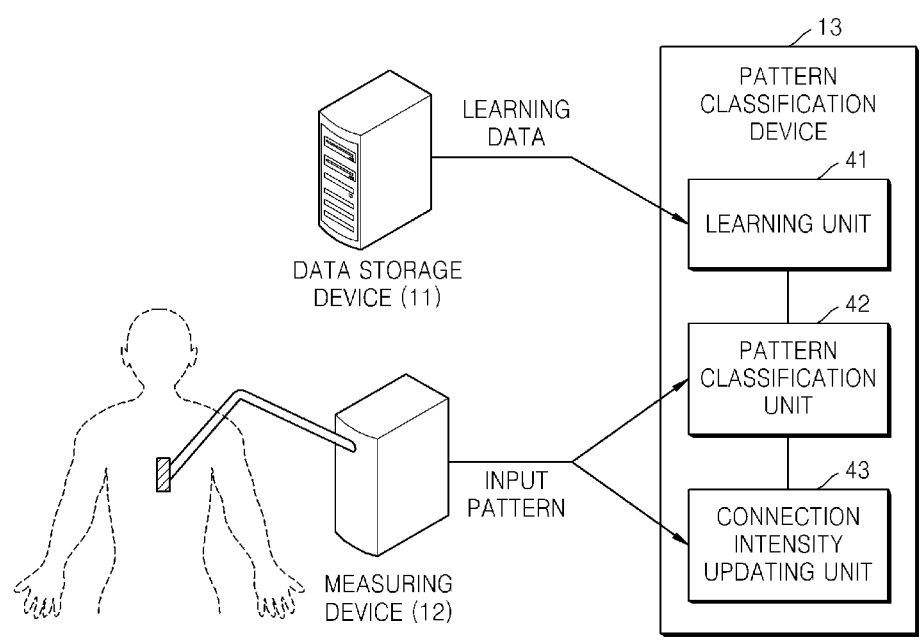
FIG. 4 is a structural diagram illustrating an example of the pattern classification device of the pattern classification system of FIG. 1.

FIG. 4 is a structural diagram illustrating an example of the pattern classification device 13 of the pattern classification system 10 of FIG. 1. Referring to the example illustrated in FIG. 4, the pattern classification device 13 includes a learning unit 41, a pattern classification unit 42, and a connection intensity updating unit 43. The pattern classification device 13 receives learning data from the data storage device 11, enables the artificial neural network to learn based on the learning data, identifies a principal component from among connection lines of the enabled artificial neural network, updates a connection intensity of the identified principal component, based on an input pattern input from the measuring device 12, and classifies the input pattern based on the updated connection intensity.

The learning unit 41 of the pattern classification device 13 receives the learning data from the data storage device 11 and enables the artificial neural network based on the learning data. The learning refers to an operation in which the artificial neural network updates connection intensity in order to generate mapping with a desired function. The desired function is represented by connection intensities of connection lines of the artificial neural network. That is, the learning refers to an operation in which the artificial neural network updates connection intensities of connection lines based on input data and output data or only input data. In an example, a learning algorithm that enables the artificial neural network to learn is classified into supervised learning and unsupervised learning. The supervised learning refers to a method of updating connection intensities of connection lines of the artificial neural network based on learning data including input data and output data corresponding thereto. The unsupervised learning refers to a method of inputting learning data including input data to the artificial neural network and updating connection intensities according to a correlation between the input data.

As a learning method of the artificial neural network, appropriate learning algorithms have been developed and used according to applied subjects. From among such learning algorithms, an error backpropagation learning algorithm has been widely used. A basic concept of the error backpropagation learning algorithm, which is a representative learning method that enables a feedforward multilayer perceptron, which is a basic structure of an artificial neural network, is based on a connection intensity of the artificial neural network being adjusted in a direction in which an error between an actual output value and an expectation value of an output layer is reduced (which is referred to as a gradient decent rule).

The error backpropagation learning requires input data and desired output data. When addition and multiplication between the input data and connection intensity are repeated several times, an output value of the input data is obtained. In this case, the output value has an error with respect to a desired output provided by the learning data. In this regard, connection intensities of connection lines between the hidden layer and the output layer are updated in proportion to the error, and connection intensities of connection lines between a next input layer and the hidden layer are updated. In this case, a direction in which connection intensities are updated is opposite to a process direction of the artificial neural network. Thus, the current method is referred to as a backpropagation learning algorithm. That is, a process of the artificial neural network is performed in a direction of an input layer→a hidden layer→an output layer. Learning of updating of the connection intensity is performed in a direction of an output layer→a hidden layer→an input layer.

The learning unit 41 of the pattern classification device 13 enables the artificial neural network including a single hidden layer to learn based on error backpropagation or an ELM method. The ELM method corresponds to a learning algorithm specialized for the artificial neural network including a single hidden layer. In an example, since the ELM method calculates an optimized connection intensity based on updating a connection intensity of a single layer in the artificial neural network including a single hidden layer, provided learning data affects connection intensity based on analyzing a change in the connection intensity as a learning result.

Figure 5:
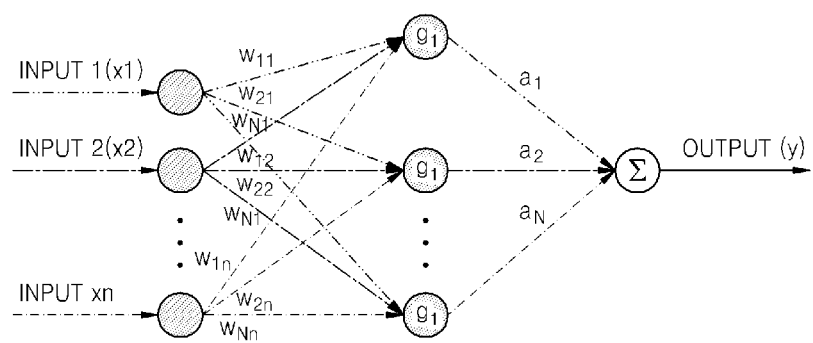
FIG. 5 is a diagram illustrating an example of a learning method of the pattern classification device of the pattern classification system of FIG. 1 based on an extreme learning machine (ELM) method.

FIG. 5 is a diagram illustrating an example of a learning method of the pattern classification device 13 of the pattern classification system 10 of FIG. 1 based on an ELM method. It is assumed that an artificial neural network including m data $\{(x_i, y_i), i=1, 2, \text{ through } m\}$, a single output layer, and N hidden layers learns. In this case, an input $x_i$ is calculated according to Formula 4 below. $y_i$ is calculated according to Formula 5 below. An output of the artificial neural network using an activation function $g(x)$ of the N hidden layers is calculated according to Formula 6 below.

$$X_i = [x_{i1}, x_{i2}, x_{i3} \ldots x_{in}]^T \in R^n \quad \text{[Formula 4]}$$

$$y_i \in R \quad \text{[Formula 5]}$$

$$g(W_j \cdot X_i) \cdot a = y_i, i = 1, 2, 3 \ldots m \quad \text{[Formula 6]}$$

In this case, $W_j$ is calculated according to Formula 7 below, is a connection intensity vector connecting a $j_{th}$ hidden layer and input layers, and is initialized to an arbitrary value. a is calculated according to Formula 8 below and is a connection intensity vector connecting hidden layers and an output layer.

$$W_j = [w_{j1}, w_{j2}, \ldots w_{jn}]^T \quad \text{[Formula 7]}$$

$$a = [a_1, a_2, \ldots a_N]^T \quad \text{[Formula 8]}$$

In this case, Formula 6 may be simply represented by Formula 9 below.

$$Ga = y \quad \text{[Formula 9]}$$

In this case, 'G' is calculated according to Formula 10 below and 'y' is calculated according to Formula 11 below.

$$G(w_1, w_2, \ldots w_N x_1, x_2, \ldots x_m) = \begin{bmatrix} g(w_1 \cdot x_1) & \ldots & g(w_N \cdot x_1) \\ & \vdots & \\ & \vdots & \\ g(w_1 \cdot x_m) & \ldots & g(w_N \cdot x_m) \end{bmatrix} \quad \text{[Formula 10]}$$

$$y = \begin{bmatrix} y_1 \\ \vdots \\ \vdots \\ y_m \end{bmatrix} \quad \text{[Formula 11]}$$

G is an output of a hidden layer of an artificial neural network. An $i_{th}$ row of G is an output vector of the $i_{th}$ hidden layer related to inputs x1, x2, through xn. Output connection intensity a is calculated according to Formula 12 below.

$$a = G^\triangledown y \quad \text{[Formula 12]}$$

In this case, $G^\triangledown$ is a generalized Moore-Penrose matrix inverse of the output G of the hidden layer and is calculated according to Formula 13 below.

$$G^\triangledown = (G^T \cdot G)^{-1} \cdot G^T \quad \text{[Formula 13]}$$

Referring back to the example illustrated in FIG. 4, the connection intensity updating unit 43 of the pattern classification device 13 identifies a principal component. That is, the connection intensity updating unit 43 of the pattern classification device 13 identifies a principal connection line from among connection lines between the hidden layer and the output layer based on a PCA method. From among connection lines between the hidden layer and the output layer, connection lines that have a greater effect on the output result than other connection lines are referred to as principal components. In an example, the principal component is identified based on a PCA method. When the PCA method is used, a set of connection intensities of connection lines is used as an input. Sets of connection intensities determined using learning data are input as input values of the PCA method and a principal component is identified from among the sets of connection intensities.

The PCA method reduces a dimension of a data group while barely affecting a signal with regard to data with high correlation based on a statistical method. A small number of basis functions are introduced, and a principal component is obtained from the basis functions. In this case, a distribution degree of each of the basis functions with respect to data is indicated by a weight vector. The weight vector is obtained by extracting the most common features of data of a first basis function and a weight vector thereof PC1 from a second basis function and a weight vector thereof PC2, and repeating corresponding operations of extracting common features from PC3, PC4, and so on, until the common features fall within a desired error. In an example, when the PCA method is used, most features of an input signal are obtained based on a small number of basis functions and a principal component.

The connection intensity updating unit 43 of the pattern classification device 13 updates a connection intensity of the identified principal component to obtain the output result as accurately as possible, based on an input pattern that is initially received from the measuring device 12. That is, classification of the input pattern is identified, an output value is determined to have a result value indicating the identified classification, and connection intensities are updated to output the result value of the identified classification when the input pattern is input. Result values are set according to classifications respectively. For example, an output value based on a predetermined input pattern is output as [0.732, −0.523], the input pattern is classified as a group 1, and a result value indicating the group 1 is [1, −1]. That is, in an example, when an output value adjacent to [1, −1] is output, the output value is accurately classified as the group 1. It is assumed that an output value based on an input pattern is [1, −1] is a result value indicating the group 1, and connection intensities of a principal component are updated. In an example, the result value indicating the group 1 is set as [1, −1], a result value indicating a group 2 is set as [1, 1], and a result value indicating a group 3 is set as [−1, −1]. By repeating the above-described operations with respect to input patterns, an output value based on an input pattern may become close to result values of groups, and input patterns of connection intensities of a principal component may be accurately classified. Result values indicating the groups may be previously set and stored for respective groups.

Figure 6:
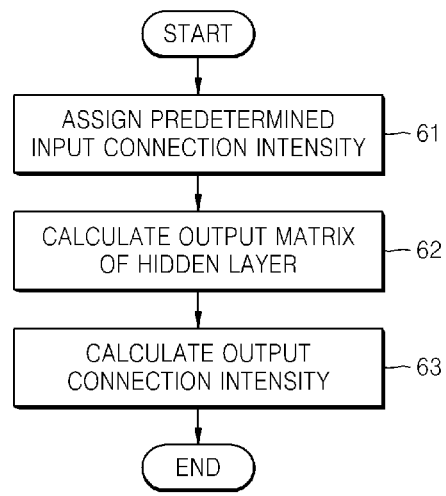
FIG. 6 is a flowchart illustrating an example of a learning method of the pattern classification device of the pattern classification system of FIG. 1 based on an ELM method.

FIG. 6 is a flowchart illustrating an example of a learning method of the pattern classification device 13 of the pattern classification system 10 of FIG. 1 based on an ELM method. Referring to the example illustrated FIG. 6, a predetermined input connection intensity is assigned (61). The input connection intensity is a connection intensity between an input layer and a hidden layer. A predetermined value is assigned to the input connection intensity that is denoted by $W_j$ in FIG. 5.

An output matrix of a hidden layer is calculated (62). The output matrix of the hidden layer is a vector of values output from hidden layers and is denoted by G in FIG. 5. In an example, the output matrix is obtained based on an input matrix and a matrix of the input connection intensity according to Formula 10.

An output connection intensity is calculated (62). The output connection intensity is a connection intensity between the hidden layer and the output layer and is denoted by a in FIG. 5. In an example, the output connection intensity is calculated by using a 'G' matrix and a 'y' matrix and according to Formula 12.

The pattern classification unit 42 of the pattern classification device 13 determines classification of an input pattern according to an output value based on the input pattern. The connection intensity updating unit 43 updates connection intensities of a principal component to be suitable for the input pattern. Thus, the pattern classification unit 42 outputs the classification of the input pattern according to the output value based on the input pattern.

Figure 7:
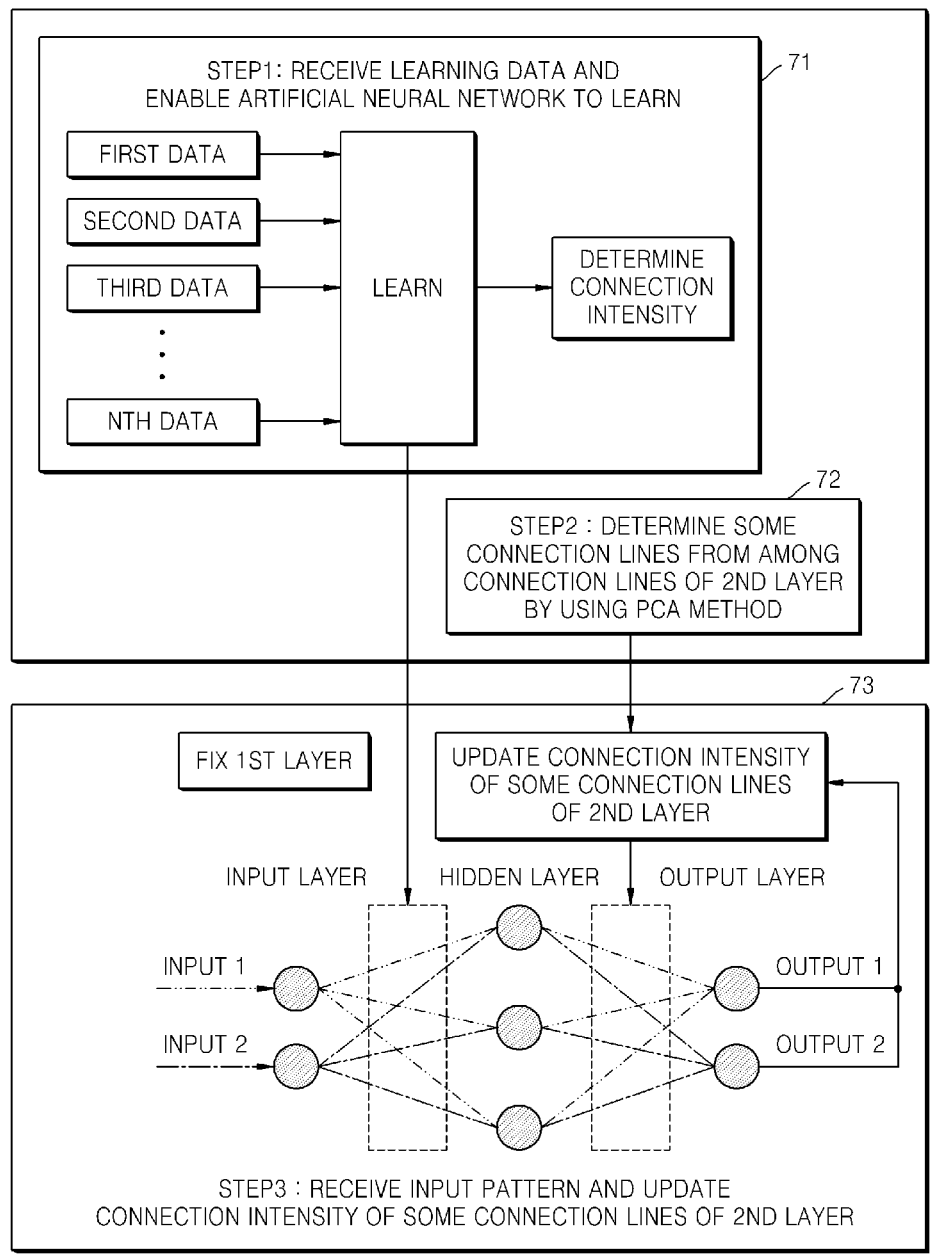
FIG. 7 is a flowchart illustrating an example of a method of classifying a pattern.

FIG. 7 is a flowchart illustrating an example of a method of classifying a pattern. Referring to the example illustrated in FIG. 7, operations 71 and 72 are training operations. Operation 73 is a test operation. The training operations include enabling an artificial neural network to learn based on learning data and identifying a principal component of the learning result of the enabled artificial neural network based on a PCA method. The test operation includes updating a connection intensity of a principal component of a $2^{nd}$ layer, based on an input pattern that is initially input and classifying the input pattern according to the connection intensity of the principal component of the $2^{nd}$ layer.

Learning data is received, the artificial neural network learns, and the connection intensities of the $1^{st}$ layer and the $2^{nd}$ layer are determined (71). In an example, the learning data may be first through $N^{th}$ data. By enabling the artificial neural network to learn based on the first through $N^{th}$ data, connection intensities of the artificial neural network are previously determined. The $1^{st}$ layer indicates connection lines between the input layer and the hidden layer. The $2^{nd}$ layer indicates connection lines between the hidden layer and the output layer. Examples of a learning method may include error backpropagation, an ELM method, and other appropriate learning methods known to one of ordinary skill in the art.

Connection intensities determined when the artificial neural network learns based on the learning data are identified (72) as a principal component from among connection lines of the $2^{nd}$ layer. The principal component of the $2^{nd}$ layer affects an output value corresponding to input data. Thus, classification of the input data may be changed by changing a connection intensity of the principal component.

An input pattern is received and the connection intensity of the principal component of the $2^{nd}$ layer is updated (73) by using an ELM method. The pattern classification device 13 classifies the input pattern. In this case, the connection intensity of the principal component of the $2^{nd}$ layer of the artificial neural network is updated based on an input pattern that is initially input to the pattern classification device 13 from among input patterns. In an example, when the connection intensity of the principal intensity of the $2^{nd}$ layer is updated, since the ELM method is used and obtains an optimized connection intensity based on the updating of a connection intensity of the principal component of the $2^{nd}$ layer, the connection intensity is updated for a short period of time compared to other learning methods. In this case, the connection intensities of the $1^{st}$ layer are fixed in a learning state of operation 71.

When an output value based on the input pattern is output, the input pattern is classified according to the output value. In this case, it is assumed that the output value based on the input pattern is a result value indicating the classification result, and the connection intensity of the principal component of the $2^{nd}$ layer is updated. That is, assuming that the result value indication the identified classification is an output value of the artificial neural network, classification of the input is identified, and the connection intensities of the principal component of the $2^{nd}$ layer are updated to obtain a result value indicating the identified classification as the output value based on the input pattern by using the ELM method.

After the connection intensity of the principal component of the $2^{nd}$ layer is updated, the input pattern is classified. The connection intensity of the principal component of the $2^{nd}$ layer of the artificial neural network is updated based on data that is initially input to the pattern classification device 13. For example, the input pattern is to be classified unlike the learning data, and connection intensities are updated based on the features of the input pattern.

Figure 8:
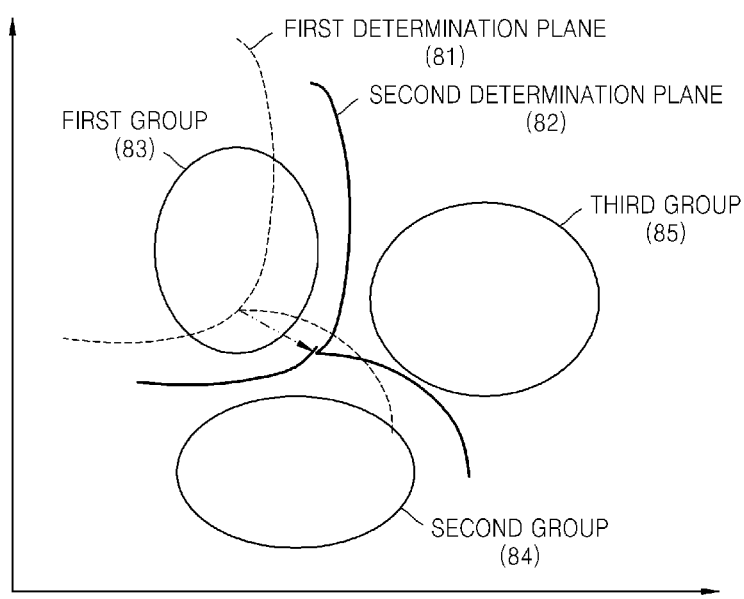
FIG. 8 is a diagram illustrating an example of a method of updating a connection intensity based on the input pattern of FIG. 7.

FIG. 8 is a diagram illustrating an example of a method of updating a connection intensity based on the input pattern of FIG. 7. Referring to the example illustrated in FIG. 8, a first determination plane 81 is updated to a second determination plane 82 in order to accurately classify the input pattern as any one of first through third groups 83 through 85. The first and second determination planes 81 and 82 are planes that conceptually classify the first through third groups 83 through 85. That is, a group of the input pattern is determined according to a position where an output value based on the input pattern is positioned. The first through third groups 83 through 85 correspond to classification results about the input pattern. The first determination plane 81 indicates a standard that classifies the input pattern before the connection intensity of the principal component of the $2^{nd}$ layer based on the input pattern. The second determination plane 82 indicates a standard that classifies the input pattern after the connection intensities of the principal component of the $2^{nd}$ layer based on the input pattern. A determination plan is changed from the first determination plane 81 to the second determination plane 82. That is, in an example, when the connection intensities of the principal component of the $2^{nd}$ layer are updated based on the input pattern, an artificial neural network having the first determination plane 81 has the second determination plane 82. In an example, the artificial neural network having the second determination plane 82 classifies the input pattern as any one of the first through third groups 83 through 85.

Figure 9:
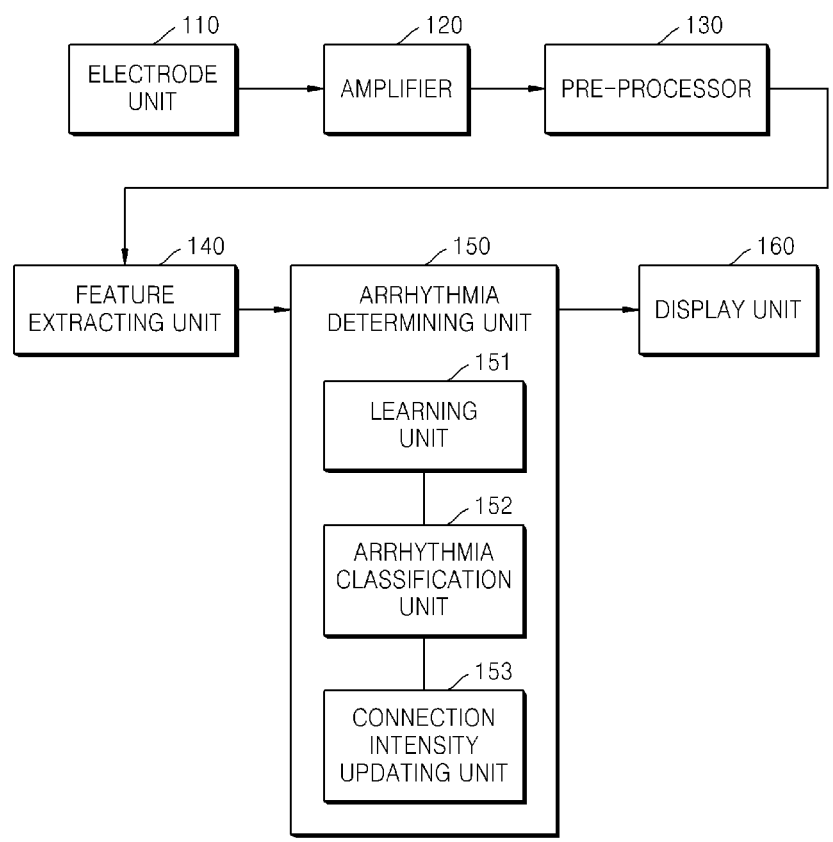
FIG. 9 is a block diagram illustrating an example of a method of diagnosing arrhythmia from an electrocardiography signal.

FIG. 9 is a block diagram illustrating an example of a method of diagnosing arrhythmia from an electrocardiography signal. An electrode unit 110 is a device that measures an electrocardiography signal from the human body. The electrode unit 110 measures the electrocardiography signal from the human body to be diagnosed with arrhythmia and outputs the electrocardiography signal to an amplifier 120.

The amplifier 120 receives the electrocardiography signal from the electrode unit 110 and amplifies the electrocardiography signal. Since the electrocardiography signal input through the electrode unit 110 is weak, the electrocardiography signal is amplified through the amplifier 120 and is output to a pre-processor 130.

The pre-processor 130 receives the amplified electrocardiography signal from the amplifier 120 and controls a noise component included in the electrocardiography signal.

A feature extracting unit 140 extracts the features of the electrocardiography signal received from the pre-processor 130 and outputs the extracted data to an arrhythmia determining unit 150. Examples of the features extracted from the electrocardiography signal include a heart rate, a QRS duration, a PR interval, a QT interval, a type of T wave, and any other feature extracted from the electrocardiography signal known to one of ordinary skill in the art. The features are changed to a numerical value and are output to the arrhythmia determining unit 150. The feature of the electrocardiography signal is extracted at a frequency corresponding to a predetermined duration. The feature of the electrocardiography signal, which is extracted for a predetermined period, is used to update a connection intensity of the artificial neural network.

Figure 10:
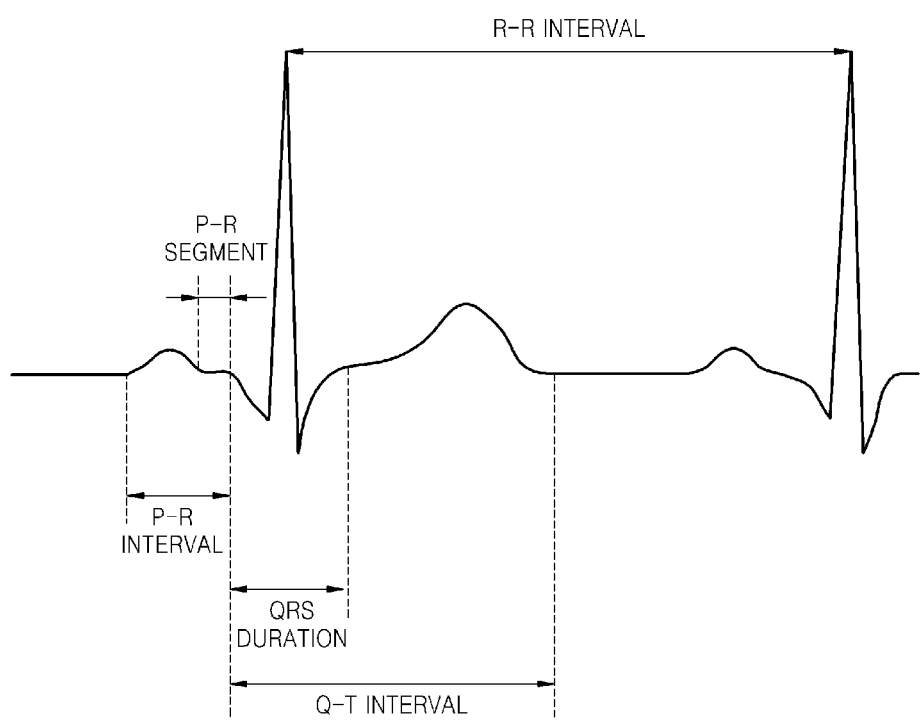
FIG. 10 is a diagram illustrating an example of name indication for respective durations of an electrocardiography signal.

FIG. 10 is a diagram illustrating an example of name indication for respective durations of an electrocardiography signal. An electrocardiogram (ECG) signal is used to diagnose heart diseases. The ECG signal is obtained by measuring an electrical signal generated from a heart and is used to determine whether the heart has a disease according to whether a conducting system from the heart to an electrode is normal or abnormal. Examples of the features extracted from the electrocardiography signal may include a heart rate, a QRS duration, a PR interval, a QT interval, a type of T wave, and any other feature extracted from the electrocardiography signal known to one of ordinary skill in the art. Such features are morphological characteristics of the electrocardiography signal.

In this regard, a value corresponding to a maximum value is extracted as a peak of an R wave at a frequency corresponding to a predetermined duration. Two points that are intersections between a curve of the R wave and a basis line are respectively extracted as a start and an end of a QRS complex. In a left part based on the start of the QRS complex, a point having a highest voltage value is extracted as a peak of a P wave. In a right part based on the end of the QRS complex, a point having a greatest difference value with the basis line from among a maximum value and a minimum value is extracted as a peak of a T wave. In a left part and a right part based on the peak of the P wave and the peak of the T wave, intersections with the basis line are extracted as starts and ends of the P and T waves. In a left part and a right part based on the peak of the R wave, points each having a lowest voltage value are extracted as a inverse peak of a Q wave and a inverse peak of a S wave, respectively. In a left part based on the inverse peak of the Q wave, a first intersection with the basis line is extracted as a start of the Q wave. In a right part based on the inverse peak of the S wave, a first intersection with the basis line is extracted as an end of the S wave. A distance from the start of the P wave to the start of the QRS complex is calculated to obtain a PR interval. A distance from the start of the QRS complex to the end of the T wave is calculated as a QT interval. A distance from the start of the Q wave to the end of the S wave is calculated as a QRS duration.

A heart rate is obtained by determining the number of basic waveforms each shown in FIG. 10 per minute. The QRS duration, the PR interval, and the QT interval are defined as shown in FIG. 10. A type of the T wave indicates a direction of the peak of the T wave. In this case, the feature extracting unit 140 extracts features as follows. In an example, the features are extracted based on morphological characteristics of the electrocardiography signal. First, with regard to a normal electrocardiography signal, as the peak of the R wave has a highest voltage value in a single electrocardiography waveform, a point corresponding to a maximum value is extracted as the peak of the R wave at a frequency corresponding to a predetermined period. Generally, in the case of the normal electrocardiography signal, the PR interval ranges from 0.6 seconds to 1 second. With regard to sinus bradycardia, when the peak of the R wave is extracted at a frequency corresponding to 0.8 seconds, R waves are skipped in some segments, and, thus, an incorrect R wave is obtained. In this case, when a predetermined number of threshold values are determined based on the basis line and the size of a wave is lower than the threshold values, the wave is not considered to be the R wave.

Then, the Q wave and the S wave are extracted. The Q wave and the S wave are respectively positioned in a left part of the R wave, which is ahead of the R wave in time, and a right part of the R wave, which is after the R wave in time. The Q wave and the S wave each exhibit a curve that has an inverse peak having a lower voltage value than the basis line. Thus, in the left part and the right part based on the peak of the R wave, points each having a lowest voltage value are found as the peak of the Q wave and the peak of the S wave, respectively.

The start of the Q wave corresponds to a first intersection with the basis line in the left part based on the peak of the Q wave. In addition, the end of the S wave corresponds to a first intersection with the basis line in the right part based on the peak of the S wave. In an example, with regard to some signals, the Q and S waves are not measured. In this case, it is assumed that a signal has the R wave only, and two intersections between the curve of the R wave and the basis line are extracted as a start and an end of a QRS complex, respectively.

In an example, when the Q wave and the S wave are found, a distance between a start of the Q wave and an end of the S wave is obtained and corresponds to a QRS duration. In general, when the QRS duration is greater than 0.12 seconds, a target signal is not normal, which corresponds to a right bundle branch block (RBBB) or a left bundle branch block (LBBB). Then, the P wave and the T wave are positioned in the left part and the right part of the QRS complex, respectively. The P wave exhibits a curve that has a peak having a higher voltage value than the basis line. In the left part based on the start of the QRS complex, a point having a highest voltage value is found as the peak of the P wave. The start and the end of the P wave correspond to intersections with the basis line in the left part and the right part based on the peak of the P wave, respectively.

A normal T wave exhibits a curve that has an inverse peak having a lower voltage value than the basis line. However, in a case of the LBBB, the T wave exhibits a curve that is directed downwards from a peak. Thus, in the right part based on the end of the QRS complex, a point having a greatest difference value with the basis line from among a maximum value and a minimum value is extracted as the peak of the T wave. In the left part and the right part based on the peak of the T wave, two intersections with the basis line are found as the start and the end of the T wave. In an example, when the P wave and the T wave are found, a distance between the start and the end of the QRS complex is calculated as the PR interval, and a distance between the start of the QRS complex and the end of the T wave is calculated as the QT interval.

Referring to the example illustrated in FIG. 9, the arrhythmia determining unit 150 includes a learning unit 151, an arrhythmia classification unit 152, and a connection intensity updating unit 153. The arrhythmia determining unit 150 inputs the data of the features of the electrocardiography signal, which are extracted from the feature extracting unit 140, to the input layer of the artificial neural network, and determines a type of arrhythmia according to the output value of the artificial neural network.

The learning unit 151 of the arrhythmia determining unit 150 enables the artificial neural network to learn based on the electrocardiography data input from the ECG-MIT-BIT DB. Since the electrocardiography data received from the ECG-MIT-BIT DB corresponds to information about the electrocardiography signal measured from a plurality of human bodies, both the input data and the output value corresponding thereto are already known. That is, the input data is extracted from the electrocardiography signal. The output value depends upon arrhythmia of the human body, which is represented by the electrocardiography signal that is measured. The output value varies according to a type of the arrhythmia. Thus, since the output value of the electrocardiography data is already known, the learning unit 151 enables the artificial neural network to learn based on the electrocardiography data input from the ECG-MIT-BIT DB, which corresponds to supervised learning. The learning unit 151 enables the artificial neural network to learn based on the electrocardiography data input from the ECG-MIT-BIT DB and determines connection intensities.

The arrhythmia classification unit 152 receives data extracted from the feature extracting unit 140 and classifies the data to determine the type of arrhythmia. The arrhythmia classification unit 152 inputs the data extracted from the feature extracting unit 140 to the input layer of the enabled artificial neural network and classifies the data based on the output value corresponding to the input data to determine the type of arrhythmia.

The connection intensity updating unit 153 updates connection intensities of some connection lines of the enabled artificial neural network based on the data extracted from the feature extracting unit 140 and the output value. The connection intensity updating unit 153 considers the output value corresponding to the data extracted from the feature extracting unit 140 as a result value indicating the classification identified by the arrhythmia classification unit 152 and updates connection intensities of some connection lines of the enabled artificial neural network. The connection intensity updating unit 153 updates connection intensities of the principal component of the $2^{nd}$ layer of the enabled artificial neural network.

Connection intensities of the principal component of the enabled artificial neural network are updated based on a personal electrocardiography signal. Personal electrocardiography signals are classified according to the personally optimized connection intensities obtained from the updating of the connection intensities based on the personal electrocardiography signal, thereby serving to classify personal arrhythmia. Thus, in an example, a type of arrhythmia is identified from among atrial fibrillation, atrial flutter, atrial tachycardia, and other types of arrhythmia known to one of ordinary skill in the art according to personal electrocardiography signals.

For example, when the arrhythmia classification unit 152 receives first data from the feature extracting unit 140 and outputs an output value [0.89, 0.77], the output value [0.89, 0.77] corresponds to atrial fibrillation from among types of arrhythmia. In addition, a result value indicating atrial fibrillation is [1, 1]. The connection intensity updating unit 153 inputs the first data to the input layer of the artificial neural network and updates connection intensities of some connection lines to output an output value [1, 1]. In an example, through this process, the artificial neural network has connection intensities suitable for a personal electrocardiography signal. Thus, in an example, by repeating the above-described processes, personal electrocardiography signals are classified to determine the type of arrhythmia.

A display unit 160 displays a result detected by the arrhythmia determining unit 150. That is, the display unit 160 indicates a type of arrhythmia based on the electrocardiography signal.

Thus far, the case where a type of arrhythmia is determined based on an electrocardiography signal has been described. Examples of a type of biological signal may include an electroencephalography (EEG) signal, an electrocardiography (ECG) signal, an electromyogram (EMG) signal, an electrooculography (EOG) signal, a skin temperature (ST) signal, a galvanic skin response (GSR) signal, a blood volume pressure (BVP) signal, and any other appropriate type of biological signal known to one of ordinary skill in the art. In examples, patterns of such biological signals are classified and used to diagnose various diseases.

The units described herein may be implemented using hardware components and software components, such as, for example, microphones, amplifiers, band-pass filters, audio to digital converters, and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors. As used herein, a processing device configured to implement a function A includes a processor programmed to run specific software. In addition, a processing device configured to implement a function A, a function B, and a function C may include configurations, such as, for example, a processor configured to implement both functions A, B, and C, a first processor configured to implement function A, and a second processor configured to implement functions B and C, a first processor to implement function A, a second processor configured to implement function B, and a third processor configured to implement function C, a first processor configured to implement function A, and a second processor configured to implement functions B and C, a first processor configured to implement functions A, B, C, and a second processor configured to implement functions A, B, and C, and so on.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums. The computer readable recording medium may include any data storage device that can store data which can be thereafter read by a computer system or processing device. Examples of the computer readable recording medium include read-only memory (ROM), random-access memory (RAM), CD-ROMs, magnetic tapes, floppy disks, optical data storage devices. In addition, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein.

Program instructions to perform a method described herein, or one or more operations thereof, may be recorded, stored, or fixed in one or more computer-readable storage media. The program instructions may be implemented by a computer. For example, the computer may cause a processor to execute the program instructions. The media may include, alone or in combination with the program instructions, data files, data structures, and the like. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable storage mediums. In addition, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein. In addition, the described unit to perform an operation or a method may be hardware, software, or some combination of hardware and software. For example, the unit may be a software package running on a computer or the computer on which that software is running A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:
1. A method of classifying an input pattern, the method comprising:
 enabling an artificial neural network to learn based on
  learning input data received by an input layer of the artificial neural network and learning output data outputted by an output layer of the artificial neural network;

determining classification of an input pattern received by the input layer according to an output value obtained from the output layer, the obtained output value being based on the input pattern;

determining a result value of the determined classification;

setting, in response to the determining of the result value, the result value to the output layer so as to form data of the learning output data, and the input pattern to the input layer;

updating, in response to the result value being set to the output layer, connection intensities of connection lines of the artificial neural network using the result value set to the output layer when the input pattern is input to the input layer; and determining updated classification of the input pattern according to an updated output value obtained from an output layer of the updated artificial neural network, the obtained updated output value being based on the input pattern and the updated connection intensities of the connection lines of the artificial neural network, wherein the result value is a representative value of the determined classification comprising an interval of output values corresponding to the input pattern and including the output value.

2. The method of claim 1, further comprising:
outputting learning output data from an output layer of the artificial neural network, the learning output data corresponding to the learning input data.

3. The method of claim 2, wherein the learning output data corresponds to the obtained output value.

4. The method of claim 1, wherein the artificial neural network comprises a single hidden layer.

5. The method of claim 1, wherein the updating of the connection intensities comprises updating a group of the connection lines between a hidden layer and the output layer of the artificial neural network.

6. The method of claim 1, further comprising:
determining the connection lines to be updated from among the connection lines of the artificial neural network.

7. The method of claim 6, wherein the determining of the connection lines comprises determining a group of the connection lines between a hidden layer and the output layer.

8. The method of claim 7, wherein the determining of the connection lines comprises determining connection intensities of the group of the connection lines between the hidden layer and the output layer based on a principal component analysis (PCA) method.

9. The method of claim 1, wherein the updating of the connection intensities comprises fixing connection intensities of a group of the connection lines between the input layer and a hidden layer of the artificial neural network, and updating connection intensities of a second group of the connection lines between the hidden layer and the output layer.

10. A non-transitory computer readable recording medium having recorded thereon a program for executing the method of claim 1.

11. A pattern classification apparatus, comprising:
memory; and
a processor, and
wherein the processor includes:

a learning unit configured to enable an artificial neural network to learn based on learning input data inputted to an input layer of the artificial neural network and learning output data outputted by an output layer of the artificial neural network;

a pattern classification unit configured to determine classification of an input pattern received by the input layer according to an output value obtained from the output layer, the obtained output value being based on the input pattern; and a connection intensity updating unit configured to determine a result value of the determined classification, set, in response to the determination of the result value, the result value to the output layer so as to form data of the learning output data, and the input pattern to the input layer, and update, in response to the result value being set to the output layer, connection intensities of connection lines of the artificial neural network using the result value set to the output layer when the input pattern is input to the input layer, wherein the pattern classification unit is further configured to determine an updated classification of the input pattern according to an updated output value obtained from an output layer of the updated artificial neural network, the obtained updated output value being based on the input pattern and the updated connection intensities of the artificial neural network, and wherein the result value is a representative value of the determined classification comprising an interval of output values corresponding to the input pattern and including the output value.

12. The pattern classification apparatus of claim 11, wherein the learning unit is further configured to output learning output data from an output layer of the artificial neural network, the learning output data corresponding to the learning input data.

13. The pattern classification apparatus of claim 12, wherein the learning output data corresponds to the obtained output value.

14. The pattern classification apparatus of claim 11, wherein the artificial neural network comprises a single hidden layer.

15. The pattern classification apparatus of claim 11, wherein the connection intensity updating unit is further configured to update a group of the connection lines between a hidden layer and the output layer of the artificial neural network.

16. The pattern classification apparatus of claim 11, wherein the connection intensity updating unit is further configured to determine the connection lines to be updated from among the connection lines of the artificial neural network.

17. The pattern classification apparatus of claim 16, wherein the connection intensity updating unit is further configured to determine a group of the connection lines between a hidden layer and the output layer.

18. The pattern classification apparatus of claim 17, wherein the connection intensity updating unit is further configured to determine connection intensities of the group of the connection lines between the hidden layer and the output layer based on a principal component analysis (PCA) method.

19. The pattern classification apparatus of claim 11, wherein the connection intensity updating unit is further configured to fix connection intensities of a group of the connection lines between the input layer and the hidden layer of the enabled artificial neural network, and update connection intensities of a second group of the connection lines between the hidden layer and the output layer.

* * * * *